United States Patent

Miller et al.

[11] Patent Number: 6,128,677
[45] Date of Patent: Oct. 3, 2000

[54] SYSTEM AND METHOD FOR IMPROVED TRANSFER OF DATA BETWEEN MULTIPLE PROCESSORS AND I/O BRIDGES

[75] Inventors: Robert J. Miller, Columbia, S.C.; Edward A. McDonald, Baton Rouge, La.

[73] Assignee: Intel Corporation, Santa Clara, Calif.

[21] Appl. No.: 08/943,677

[22] Filed: Oct. 15, 1997

[51] Int. Cl.[7] .................................................. G06F 13/36
[52] U.S. Cl. ............................... 710/40; 710/107; 710/18
[58] Field of Search ..................................... 395/287–305, 395/835–839, 856–865; 710/1.7–125, 15–19, 36–45

[56] References Cited

U.S. PATENT DOCUMENTS

| | | | |
|---|---|---|---|
| 3,688,274 | 8/1972 | Cormier et al. | 395/825 |
| 4,396,984 | 8/1983 | Videki, II | 395/858 |
| 4,495,571 | 1/1985 | Staplin, Jr. et al. | 395/293 |
| 4,521,848 | 6/1985 | Bruce et al. | 395/183.19 |
| 4,897,786 | 1/1990 | Pimm et al. | 395/288 |
| 4,916,659 | 4/1990 | Persoon et al. | 364/900 |
| 5,341,491 | 8/1994 | Ramanujan | 711/152 |
| 5,392,425 | 2/1995 | Elliott et al. | 395/182.14 |
| 5,475,859 | 12/1995 | Kamabayashi et al. | 395/825 |
| 5,535,340 | 7/1996 | Bell et al. | 395/292 |
| 5,546,546 | 8/1996 | Bell et al. | 395/292 |
| 5,548,733 | 8/1996 | Sarangdhar et al. | 395/286 |
| 5,550,988 | 8/1996 | Sarangdhar et al. | 395/293 |
| 5,568,620 | 10/1996 | Sarangdhar et al. | 395/285 |
| 5,572,702 | 11/1996 | Sarangdhar et al. | 395/473 |
| 5,581,782 | 12/1996 | Sarangdhar et al. | 395/800 |
| 5,615,343 | 3/1997 | Sarangdhar et al. | 395/282 |
| 5,644,733 | 7/1997 | Kalish et al. | 395/293 |
| 5,706,446 | 1/1998 | Kalish et al. | 395/293 |
| 5,724,609 | 3/1998 | Hatae et al. | 395/842 |

*Primary Examiner*—Christopher B. Shin
*Attorney, Agent, or Firm*—Blakely, Sokoloff, Taylor & Zafman, LLP

[57] ABSTRACT

A controller is provided, for use in a processing system containing a plurality of processors operable to communicate with a plurality of I/O devices, for directing a first I/O request issued by a first selected one of the plurality of processors to a targeted one of the I/O devices. The controller device comprises a counter for counting a number of retries associated with the first I/O request and comparison circuitry for comparing a count value in the counter with a first predetermined limit, wherein the controller, in response to a determination that the count value in the counter exceeds the first predetermined limit, blocks all other I/O requests issued by the plurality of processors from being directed to the targeted I/O device.

20 Claims, 4 Drawing Sheets

SYSTEM AND METHOD FOR IMPROVED TRANSFER OF DATA BETWEEN MULTIPLE PROCESSORS AND I/O BRIDGES

CROSS-REFERENCE TO RELATED PATENT APPLICATIONS

The present invention is related to that disclosed in U.S. patent application Ser. No. 08/760,126, filed Dec. 3, 1996, entitled "COMPUTER SYSTEM INCLUDING MULTIPLE SNOOPED, MULTIPLE MASTERED SYSTEM BUSSES AND METHOD FOR INTERCONNECTING SAID BUSSES." U.S. patent application Ser. No. 08/760, 126 is commonly assigned to the assignee of the invention disclosed in this patent document and is incorporated herein by reference for all purposes as if fully set forth herein.

TECHNICAL FIELD OF THE INVENTION

The present invention is directed, in general, to multiprocessor systems and, more specifically, to a system and method for improving the forward progress of data from one or more processors to an external subsystem via one or more I/O bridges.

BACKGROUND OF THE INVENTION

Increasingly, state-of-the-art computer applications implement high-end tasks that require multiple processors for efficient execution. Multiprocessor systems allow parallel execution of multiple tasks on two or more central processor units ("CPUs"). A typical multiprocessor system may be, for example, a network server. Preferably, a multiprocessor system is built using widely available commodity components, such as the Intel Pentium Pro™ processor (also called the "P6" processor), PCI I/O chipsets, P6 bus topology, and standard memory modules, such as SIMMs and DIMMs. There are numerous well-known multiprocessor system architectures, including symmetrical multiprocessing ("SMP"), non-uniform memory access ("NUMA"), cache-coherent NUMA ("CC-NUMA"), clustered computing, and massively parallel processing ("MPP").

A symmetrical multiprocessing ("SMP") system contains two or more identical processors that independently process as "peers" (i.e., no master/slave processing). Each of the processors (or CPUs) in an SMP system has equal access to the resources of the system, including memory access. A NUMA system contains two or more equal processors that have unequal access to memory. NUMA encompasses several different architectures that can be grouped together because of their non-uniform memory access latency, including replicated memory cluster ("RMC"), MPP, and CC-NUMA. In a NUMA system, memory is usually divided into local memories, which are placed close to processors, and remote memories, which are not close to a processor or processor cluster. Shared memories may be allocated into one of the local memories or distributed between two or more local memories. In a CC-NUMA system, multiple processors in a single node share a single memory and cache coherency is maintained using hardware techniques. Unlike an SMP node, however, a CC-NUMA system uses a directory-based coherency scheme, rather than a snoopy bus, to maintain coherency across all of the processors. RMC and MPP have multiple nodes or clusters and maintain coherency through software techniques. RMC and MPP may be described as NUMA architectures because of the unequal memory latencies associated with software coherency between nodes.

All of the above-described multiprocessor architectures require some type of cache coherence apparatus, whether implemented in hardware or in software. High speed CPUs, such as the P6 processor, utilize an internal cache and, typically, an external cache to maximize the CPU speed. Because a SMP system usually operates only one copy of the operating system, the interoperation of the CPUs and memory must maintain data coherency. In this context, coherency means that, at any one time, there is but a single valid value for each datum. It is therefore necessary to maintain coherency between the CPU caches and main memory.

One popular coherency technique uses a "snoopy bus." Each processor maintains its own local cache and "snoops" on the bus to look for read and write operations between other processors and main memory that may affect the contents of its own cache. If a first processor attempts to access a datum in main memory that a second processor has modified and is holding in its cache, the second processor will interrupt the memory access of the first processor and write the contents of its cache into memory. Then, all other snooping processors on the bus, including the first processor, will see the write operation occur on the bus and update their cache state information to maintain coherency.

Another popular coherency technique is "directory-based cache coherency." Directory-based caching keeps a record of the state and location of every block of data in main memory. For every shareable memory address line, there is a presence bit for each coherent processor cache in the system. Whenever a processor requests a line of data from memory for its cache, the presence bit for that cache in that memory line is set. Whenever one of the processors attempts to write to that memory line, the presence bits are used to invalidate the cache lines of all the caches that previously used that memory line. All of the presence bits for the memory line are then reset and the specific presence bit is set for the processor that is writing to the memory line. Therefore, all of the processors do not have to reside on a common snoop bus because the directory maintains coherency for the individual processors.

In a typical multiprocessor architecture, the processors are interfaced to main memory by means of a memory controller which arbitrates the memory requests of the competing processors and transfers data between main memory and the processors. Often, the memory controller also interfaces a plurality of I/O devices to main memory and to the processors. For example, the memory controller may be coupled to a plurality of I/O bridges by means of an I/O bus. The I/O bridges provide an interface between the I/O bus and one or more external subsystems on the other side of the I/O bridge. In an exemplary system, the external I/O subsystems may be PCI subsystems, such as video cards and SCSI adapters and the like, that are plugged into expansion card slots.

The memory controller propagates requests to the I/O subsystem from the CPU bus down to the I/O bus, thereby allowing data to be sent to, or received from, an external I/O subsystem. Under normal circumstances, the I/O bridge accepts CPU-issued I/O requests that target the I/O subsystem and completes them in order. However, it is possible for the I/O bridge to retry outbound CPU I/O requests due to I/O traffic. In these cases, the I/O bridge begins by opening a slot for the outbound CPU cycles. When multiple CPUs are contending to access the same I/O bridge, it is possible for one or more CPU I/O requests to repeatedly steal the slot opened up by the I/O bridge for a previous, different CPU I/O request. Contention between incoming I/O transactions and the ordering requirement for both outgoing and incoming transactions requires the I/O bridge to retry outbound CPU-issued I/O requests until a slot can be made by throttling the inbound I/O transfers. If there are a sufficient number of CPU-issued I/O requests competing with sufficient incoming I/O transactions, both performance and fairness can be degraded, possibly even to the extent of causing an indefinite starvation due to a lack of forward progress, which could eventually cause a multiprocessor system crash due to these live lock conditions.

Therefore, there is a need in the art for improved multi-processor systems that maintain forward progress from the CPU to the I/O bridge until a possible contention condition is detected. In particular there is a need in the art for systems, circuits, and methods that are able to track the number of times a CPU-issued I/O request to an output I/O bridge is retried and force the I/O bridge to accept a CPU I/O request that has been repeatedly retried.

SUMMARY OF THE INVENTION

The I/O request retry problems inherent in the prior art are overcome by the present invention. In one embodiment of the present invention, a controller is provided, for use in a processing system containing a plurality of processors operable to communicate with a plurality of I/O devices, for directing a first I/O request issued by a first selected one of the plurality of processors to a targeted one of the I/O devices. The controller device comprises a counter that counts a number of retries associated with the first I/O request; and comparison circuitry that compares a count value in the counter with a first predetermined limit, wherein the controller, in response to a determination that the count value in the counter exceeds the first predetermined limit, blocks all other I/O requests issued by the plurality of processors from being directed to the targeted I/O device.

In one embodiment of the present invention, the first predetermined limit is programmable. In other embodiments of the present invention, the controller continues to direct I/O requests not directed to the targeted I/O device to other devices in the processing system.

In further embodiments of the present invention, the comparison circuitry further compares the count value in the counter to a second predetermined limit after the controller has blocked all other I/O requests issued by the plurality of processors from being directing to the plurality of I/O devices.

In still other embodiments of the present invention, the controller, in response to a determination that the count value in the counter exceeds the second predetermined limit causes the first selected processor to retry the I/O request. In still further embodiments of the present invention, the second predetermined limit is also programmable.

The foregoing has outlined rather broadly the features and technical advantages of the present invention so that those skilled in the art may better understand the detailed description of the invention that follows. Additional features and advantages of the invention will be described hereinafter that form the subject of the claims of the invention. While the current state of the art favors a hardware implementation of the present invention, those skilled in the art will recognize that, in the future, the foregoing functionality may be implemented in software, hardware, firmware or some suitable combination of at least two of the same. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like objects/things and in which.

DETAILED DESCRIPTION

Although the text that follows describes the present invention in a symmetric multiprocessing system, it should be clearly understood that this is by way of illustration only. Those skilled in the art will understand that the principles of the present invention may readily be incorporated in a wide variety of multiprocessor systems, including but not limited to NUMA, RMC, CC-NUMA, MPP, and other like systems, in order to maintain and improve forward progress of I/O requests. Additionally, the phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like.

Figure 1:
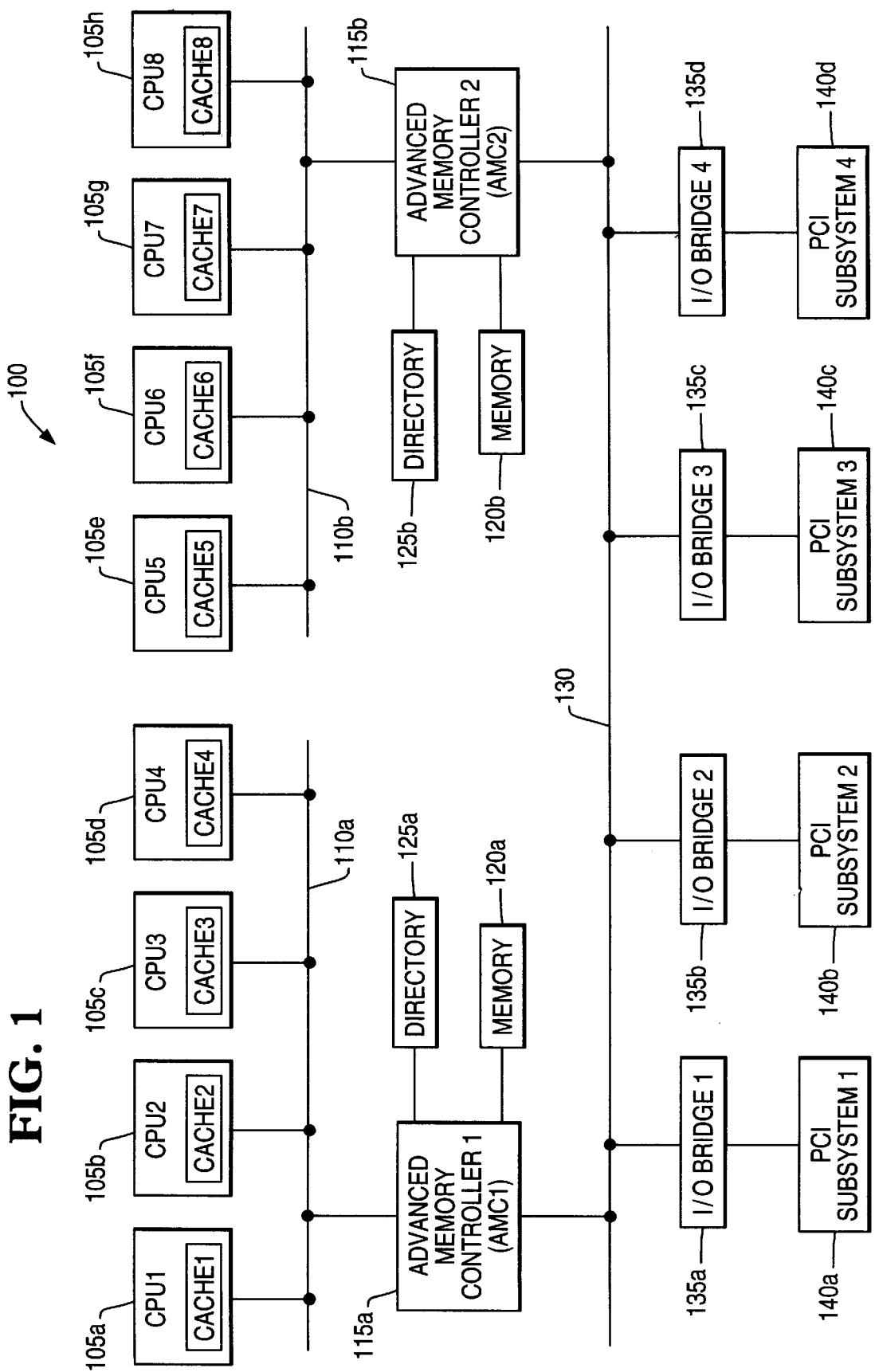
FIG. 1 is a block diagram of an exemplary eight processor super high volume symmetric multiprocessing computer system employing a pair of advanced memory controllers in accordance with one embodiment of the present invention.

Turning initially to FIG. 1, illustrated is a block diagram of an exemplary eight processor standard high volume ("SHV") symmetric multiprocessing ("SMP") system (generally designated 100) employing a pair of advanced memory controllers 115 in accordance with one embodiment of the present invention. SMP system 100 contains two separate processor building blocks. A first building block comprises processors 105a–105d (hereafter, "CPU1" through "CPU4"), advanced memory controller 115a (hereafter, "AMC1"), memory 120a and directory 125a. A second building block comprises processors 105e–105h (hereafter, "CPU5" through "CPU8"), advanced memory controller 115b (hereafter, "AMC2"), memory 120b and directory 125b. The two building blocks are interconnected by a common I/O bus 130.

Within the first building block, CPU1 through CPU4 are coupled to AMC1 by CPU bus 110a. Within the second building block, CPU5 through CPU8 are coupled to AMC2 by CPU bus 110b. In one embodiment of the present invention, CPU bus 110 is high-bandwidth split-transaction bus coupled to one port of the AMC. The second port of the AMC is coupled to I/O bus 130. I/O bus 130 is coupled to four PCI subsystems 140a through 140d (hereafter, "PCI Subsystem 1" through "PCI Subsystem 4") by means of I/O bridges 135a–135d (hereafter, I/O Bridge 1 through I/O Bridge 4). AMC 1 and AMC 2 control access to memory 120a and memory 120b, respectively. In one embodiment of the present invention, memory 120a and memory 120b are DRAM arrays in which coherency is maintained by use of protocols and a directory.

SMP system 100 implements a hybrid cache coherency scheme to keep track of data moving between and among the various CPU caches, memories 120a and 120b, and CPU 1 through CPU 8. CPU1 through CPU4 contain cache memories (hereafter, "Cache 1 through Cache 4", respectively). CPU5 through CPU8 contain cache memories (hereafter, "Cache 5 through Cache 8", respectively). The CPU cache memories may be internal or external caches. CPU 1 through CPU 4 may use a bus snooping protocol on CPU bus 110a to maintain coherency with one another and memory 120a. Likewise, CPU 5 through CPU 8 may use a bus snooping protocol on CPU bus 110b to maintain coherency with one another and memory 120b. If a processor needs data that is available and being held "dirty" (i.e, modified) in the cache of another processor, the processors will exchange the data, rather than access the memories 120a and 120b, thereby maintaining coherency between the processors.

Coherency between main memories 120a and 120b and Cache 1 through Cache 8 is maintained by a combination centralized/distributed directory-based cache coherency. Within directories 125a and 125b, a memory line status table ("MLST") identifies which group of processors (i.e., CPU 1 through CPU 4 or CPU 5 through CPU 8) that are coupled by a common bus (i.e., CPU bus 110a or CPU bus 110b) have which lines of memory in their associated cache memories (i.e., Cache 1 through Cache 4 or Cache 5 through Cache 8). When a processor requests data, the status table identifies where the most recent, or current, copy of the data resides. Advantageously, this method of maintaining cache coherency does not require additional work to be performed until a processor needs data that resides in a cache that cannot be accessed through snooping.

In a preferred embodiment of the present invention, all of the components, except for AMC 1 and AMC 2, of SMP system 100 comprise commodity chips, thereby minimizing system costs. For example, CPU 1 through CPU 8 may be Intel Pentium Pro™ processors, I/O bus 130 may be comprised of the PCI I/O chipset, and CPU busses 110a and 110b and I/O bus 130 may be implemented using the Pentium Pro bus topology. A more detailed discussion of the operation of SMP system 100 and, more particularly, AMC 1 and AMC 2, is provided in U.S. patent application Ser. No. 08/760,126, filed Dec. 3, 1996, entitled "COMPUTER SYSTEM INCLUDING MULTIPLE SNOOPED, MULTIPLE MASTERED SYSTEM BUSSES AND METHOD FOR INTERCONNECTING SAID BUSSES," which was previously incorporated herein by reference.

Figure 2:
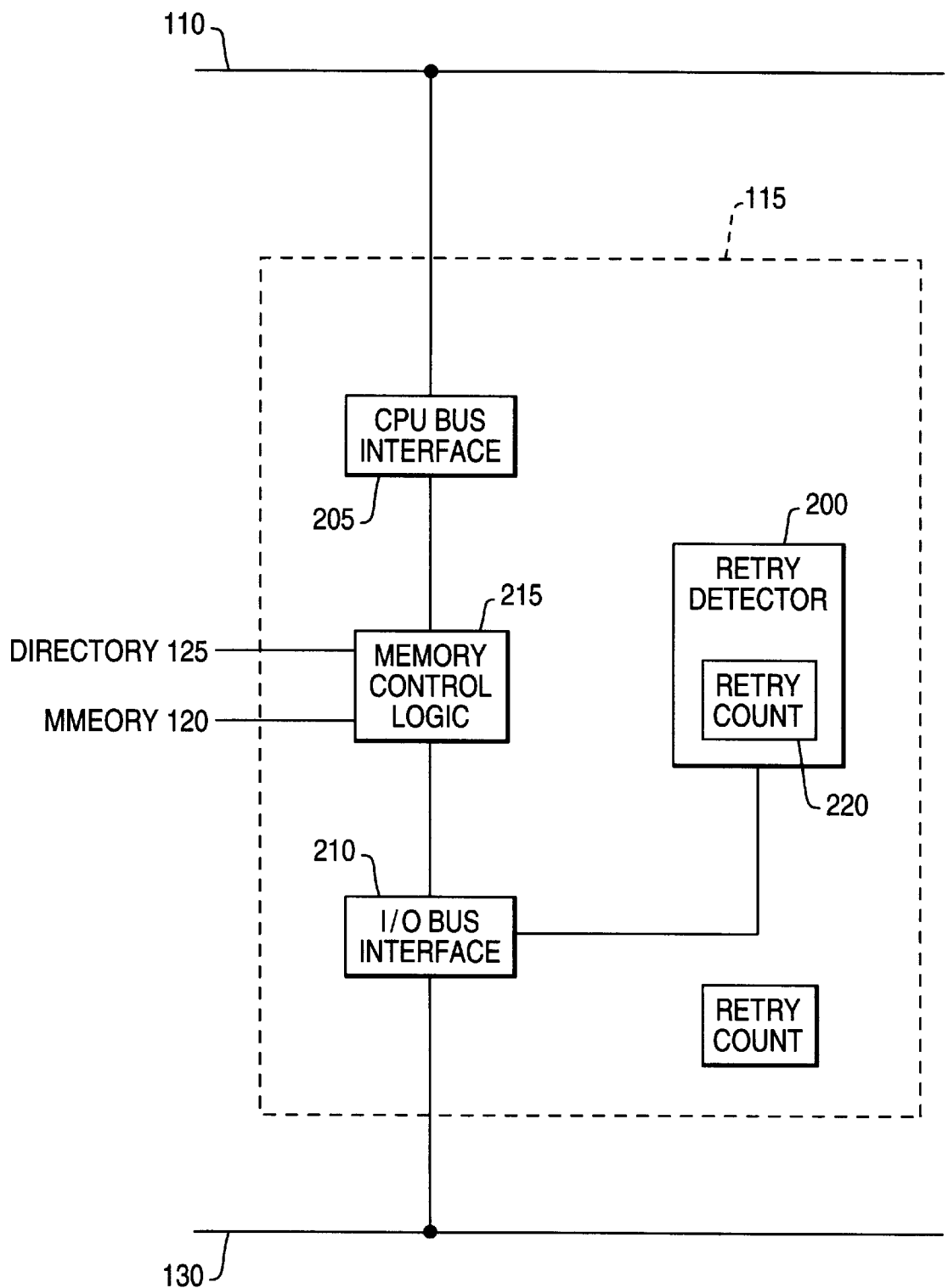
FIG. 2 is a block diagram of an exemplary retry detector in accordance with one embodiment of the present invention.

Turning now to FIG. 2, illustrated is a block diagram of AMC 115 having an exemplary retry detector 200 in accordance with one embodiment of the present invention. In addition to memory request generator 200, AMC 115 further comprises a CPU bus interface 205, an I/O bus interface 210 and memory control logic 215. Memory control 215 controls a memory line status table ("MLST") in directory 125 and generates/controls memory intervention commands and a dual ported DRAM controller. Memory requests are received from I/O bus 130 and from CPU bus 110 and are directed to the appropriate line in memory 120. Additionally, the CPUs coupled to CPU bus 110 can issue I/O requests to the I/O bridges coupled to I/O bus 130 through AMC 115.

Retry detector 200 is coupled to I/O interface 210 and detects when a request that is issued on the I/O bus 130 is directed to any of the I/O bridges, I/O Bridge 1 through I/O Bridge 4. CPU requests that are issued by AMC 115a onto I/O bus 130 may also be directed to AMC 115b in addition to the I/O bridges. Likewise, CPU requests that are issued by AMC 115b onto I/O bus 130 may also be directed to AMC 115a in addition to the I/O bridges.

Figure 3A:
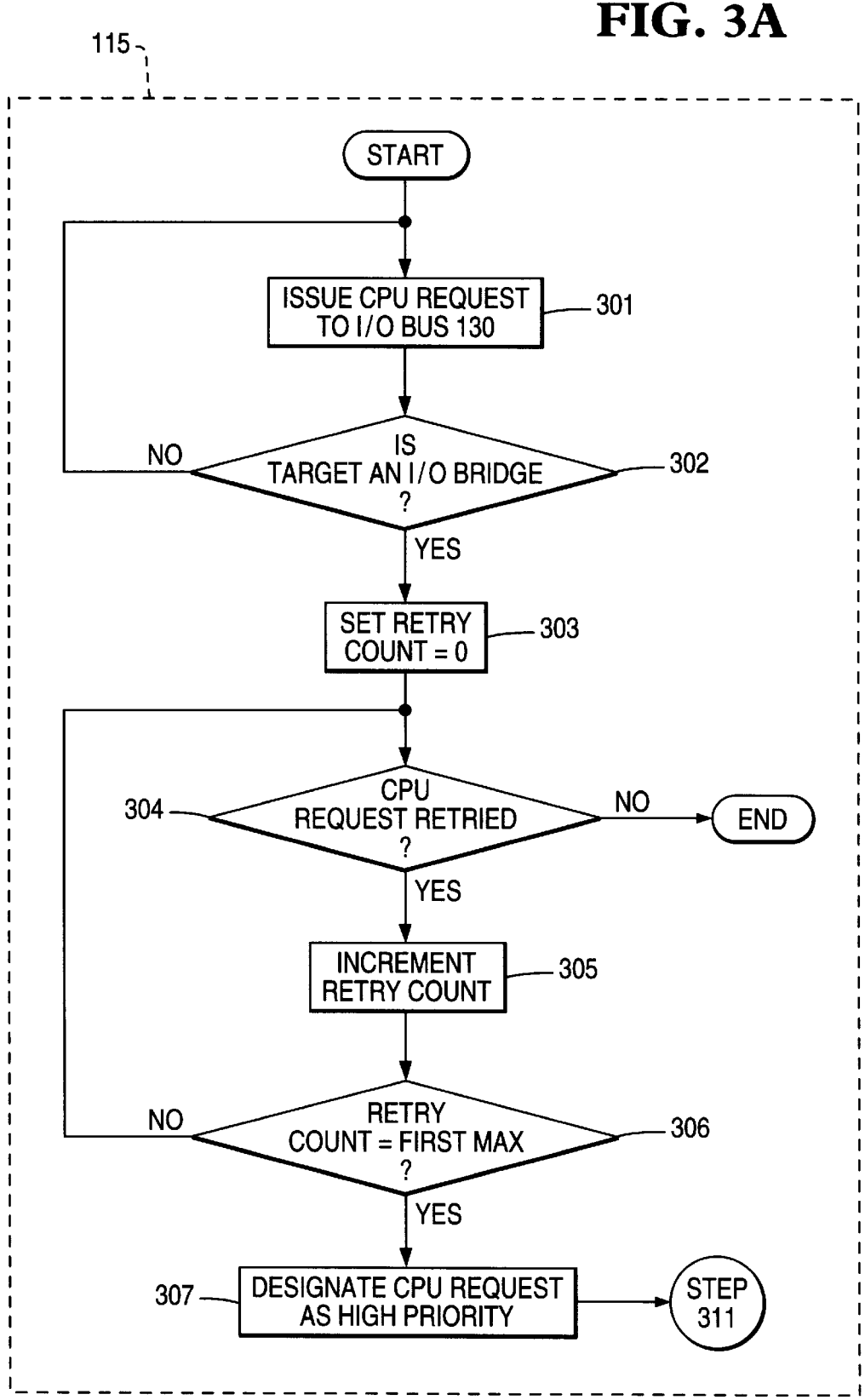
FIGS. 3A and 3B are a flow diagram depicting an exemplary operation of an advanced memory controller containing a retry detector in accordance with one embodiment of the present invention.
Figure 3B:
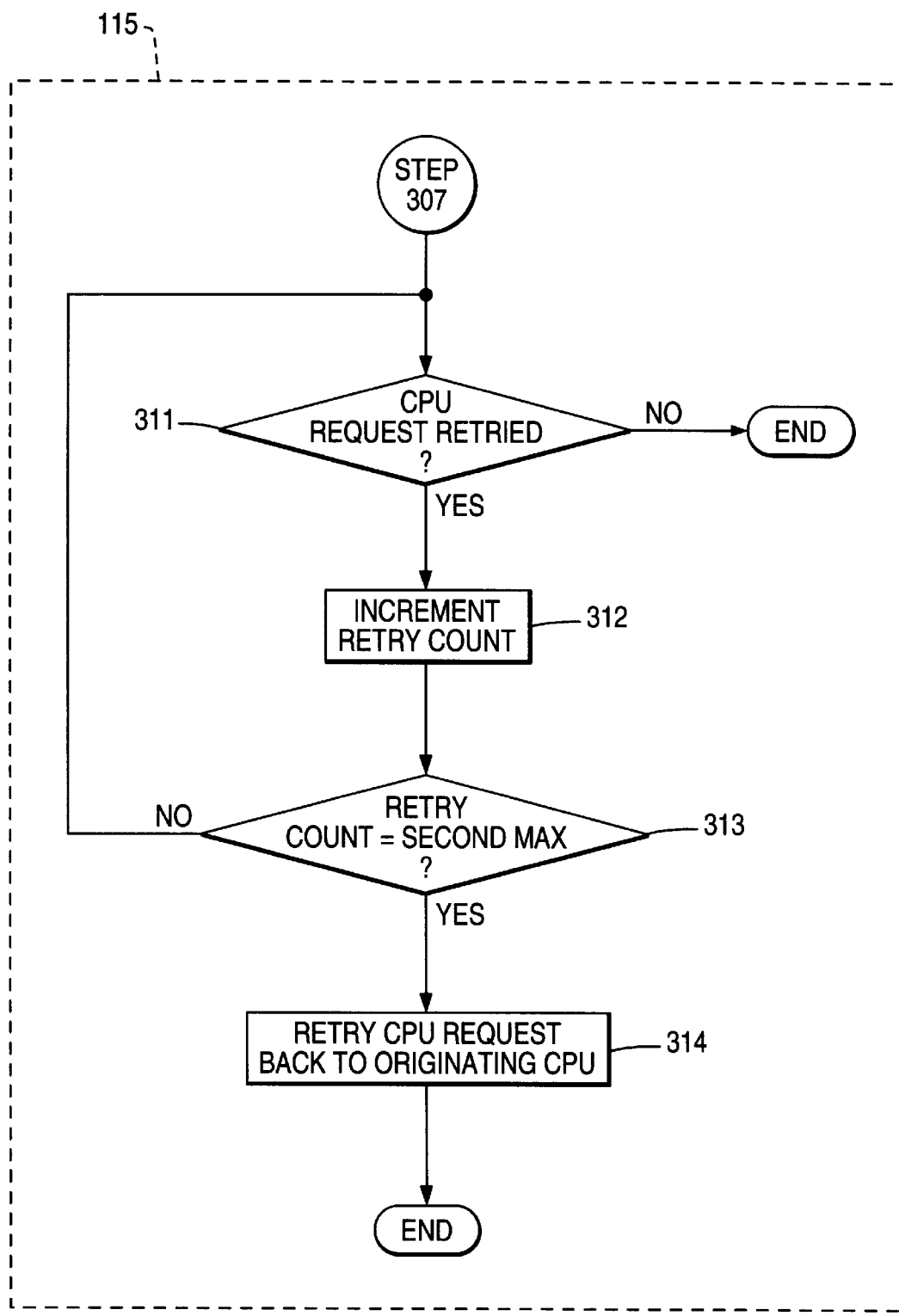

Turning lastly to FIGS. 3A and 3B, illustrated is an exemplary flow diagram depicting the operation of an advanced memory controller 115 containing a retry detector 200 in accordance with one embodiment of the present invention. AMC 115 issues a CPU request onto I/O bus 130, process step 301, and determines that the request has targeted an I/O bridge, process step 302. AMC 115 then begins tracking the number of times the I/O request is retried. AMC 115 will initialize (i.e., set to zero) a counter 220 containing the value "Retry Count" that is associated with that particular I/O request, process step 303. Thereafter, as retry detector 220 detects that the I/O request has been retried by the targeted I/O bridge, process step 304, the value of Retry Count is incremented, process step 305.

Next, Retry Count is compared to a first programmable maximum or upper limit, process step 306. Retry detector 200 may comprise, be coupled to, or be associated with, comparison circuitry (not shown) for performing such a comparison. When Retry Count equals the upper limit, AMC 115 designates the I/O request as a high-priority request, process step 307. Thereafter, AMC 115 blocks out all other CPU-issued I/O requests that are being sent to I/O bus 130 until the targeted I/O bridge services the retried I/O request. In some embodiments of the present invention, the AMC 115 not only blocks I/O requests issued by its associated CPUs, the AMC 115 also sends signal to the other AMC 115 that block out CPU-issued I/O requests that are being sent to I/O bus 130 by the other AMC 115. For example, AMC 115a may block out all other CPU-issued I/O requests that are being sent to I/O bus 130 from any one of CPU 1 through CPU 4 and may also send a signal to AMC 115b that causes AMC 115b to block out all other CPU-issued I/O requests that are being sent to I/O bus 130 from any one of CPU 5 through CPU 8.

In this way, no other I/O request can steal the slot of the retried I/O request. There are some minor exceptions to this rule. If AMC 115 determines that an I/O request sent to I/O bus 130 cannot possibly be directed to the targeted I/O bridge, then AMC 115 will allow that I/O request to be sent to I/O bus 130.

In a preferred embodiment of the present invention, after designating the retried I/O request as a high-priority request, retry detector 200 continues to detect retries associated with the retried I/O request, process step 311, and increments Retry Count as the I/O request continues to be retried by the targeted I/O bridge, process step 312. Retry Count is then compared to a second programmable maximum/upper limit, process step 313, that is much higher than the first programmable upper limit. When Retry Count equals the second upper limit, AMC 115 causes the I/O request to be retried all the way back to the original CPU that issued the I/O request, process step 314. At this point, the original I/O request is essentially canceled and a new I/O request is retried from the very start. As long as none of the Retry Count limits of any of the I/O requests is exceeded, AMC 115 continues to issue pipelined transactions to I/O bus 130, which allows for optimal performance. Only when a Retry Count limit is exceeded does the AMC block out all other I/O requests, thereby dropping into a somewhat degraded mode of operation.

Although the present invention and its advantages have been described in detail, those skilled in the art should understand that various changes, substitutions and alterations herein may be made without departing from the spirit and scope of the invention in its broadest form.

What is claimed is:

1. For use in a processing system containing a plurality of processors operable to communicate with a plurality of I/O devices, a controller for directing a first I/O request issued by a first selected one of said plurality of processors to a targeted one of said I/O devices, said controller comprising:

a counter for counting a number of retries associated with said first I/O request; and comparison circuitry for comparing a count value in said counter with a first predetermined limit, wherein said controller, in response to a determination that said count value in said counter exceeds said first predetermined limit, blocks all other I/O requests issued by said plurality of processors from being directing to said targeted I/O device.

2. The controller set forth in claim 1 wherein said first predetermined limit is programmable.

3. The controller set forth in claim 1 wherein said controller continues to direct I/O requests not directed to said targeted I/O device to other devices in said processing system.

4. The controller set forth in claim 1 wherein said comparison circuitry further compares said count value in said counter to a second predetermined limit after said controller has blocked all other I/O requests issued by said plurality of processors from being directed to said plurality of I/O devices.

5. The controller set forth in claim 4 wherein said controller, in response to a determination that said count value in said counter exceeds said second predetermined limit, causes said first selected processor to retry said I/O request.

6. The controller set forth in claim 4 wherein said second predetermined limit is programmable.

7. A processing system comprising:

a plurality of processors;

a plurality of I/O devices;

a controller coupled to said plurality of processors by a first common bus and to said plurality of I/O devices by a second common bus, said controller operable to direct a first I/O request issued by a first selected one of said processors to a targeted one of said I/O devices, said controller comprising:

a counter for counting a number of retries associated with said first I/O request; and comparison circuitry for comparing a count value in said counter with a first predetermined limit, wherein said controller, in response to a determination that said count value in said counter exceeds said first predetermined limit, blocks all other I/O requests issued by said plurality of processors from being directing to said targeted I/O device.

8. The processing system set forth in claim 7 wherein said first predetermined limit is programmable.

9. The processing system set forth in claim 7 wherein said controller continues to direct I/O requests not directed to said targeted I/O device to other devices in said processing system.

10. The processing system set forth in claim 7 wherein said comparison circuitry further compares said count value in said counter to a second predetermined limit after said controller has blocked all other I/O requests issued by said plurality of processors from being directed to said plurality of I/O devices.

11. The processing system set forth in claim 10 wherein said controller, in response to a determination that said count value in said counter exceeds said second predetermined limit, causes said first selected processor to retry said I/O request.

12. The processing system set forth in claim 10 wherein said second predetermined limit is programmable.

13. In a processing system containing a plurality of processors operable to communicate with a plurality of I/O devices, a method for directing a first I/O request issued by a first selected one of the plurality of processors to a targeted one of the I/O devices, the method comprising the steps of:

sending the first I/O request to the targeted I/O device;

detecting a retry request returned by the targeted I/O device;

initializing a retry count value in a counter; and incrementing the retry count value in the counter in response to the detection of the retry; and comparing the retry count value in the counter with a first predetermined limit and, in response to a determination that the retry count value in the counter exceeds the first predetermined limit, blocking all other I/O requests issued by the plurality of processors.

14. The method set forth in claim 13 including the further step of comparing the retry count value in the counter with a first predetermined limit and, in response to a determination that the retry count value in the counter exceeds the first predetermined limit, blocking all other I/O requests issued by the plurality of processors from being directing to the targeted I/O device.

15. The method set forth in claim 14 including the further steps of;

detecting a second retry request returned by the targeted I/O device;

incrementing the retry count value in the counter in response to the detection of the second retry request; and comparing the retry count value in the counter with the first predetermined limit and, in response to a determination that the retry count value in the counter exceeds the first predetermined limit, blocking all other I/O requests issued by the plurality of processors from being directing to the targeted I/O device.

16. The method set forth in claim 14 wherein the first predetermined limit is programmable.

17. The method set forth in claim 15 including the further step of directing I/O requests not directed to the targeted I/O device to other devices in the processing system.

18. The method set forth in claim 15 including the further step of comparing the retry count value in the counter to a second predetermined limit after the controller has blocked all other I/O requests issued by the plurality of processors from being directed to the plurality of I/O devices.

19. The method set forth in claim 18 including the further step of causing the first selected processor to retry the I/O request, in response to a determination that the retry count value in the counter exceeds the second predetermined limit.

20. The controller set forth in claim 18 wherein the second predetermined limit is programmable.

* * * * *